(12) United States Patent
Lamfalusi et al.

(10) Patent No.: US 9,256,769 B1
(45) Date of Patent: Feb. 9, 2016

(54) MOBILE READER DEVICE

(71) Applicant: Square, Inc., San Francisco, CA (US)

(72) Inventors: Mike Lamfalusi, San Francisco, CA (US); Jesse Dorogusker, San Francisco, CA (US); Dan Post, San Francisco, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/189,997

(22) Filed: Feb. 25, 2014

(51) Int. Cl.
*G06K 7/08* (2006.01)
*G06K 7/01* (2006.01)

(52) U.S. Cl.
CPC ... *G06K 7/01* (2013.01); *G06K 7/08* (2013.01)

(58) Field of Classification Search
CPC ..... G06Q 20/34; G06Q 20/00; G06Q 20/327; G06Q 20/3278; H04M 2250/14; H04M 17/00; H04L 1/0025; H04L 69/18; H04W 88/06
See application file for complete search history.

(56) References Cited

U.S. PATENT DOCUMENTS

| | | | |
|---|---|---|---|
| 3,854,036 | A | 12/1974 | Gupta |
| 4,035,614 | A | 7/1977 | Frattarola et al. |
| 4,254,441 | A | 3/1981 | Fisher |
| 4,591,937 | A | 5/1986 | Nakarai et al. |
| 4,609,957 | A | 9/1986 | Gentet et al. |
| 4,727,544 | A | 2/1988 | Brunner et al. |
| 4,788,420 | A | 11/1988 | Chang et al. |
| 4,845,740 | A | 7/1989 | Tokuyama et al. |
| 5,173,597 | A | 12/1992 | Anglin |
| 5,266,789 | A | 11/1993 | Anglin et al. |
| 5,406,627 | A | 4/1995 | Thompson et al. |
| 5,434,395 | A | 7/1995 | Storck et al. |
| 5,434,400 | A | 7/1995 | Scherzer |

(Continued)

FOREIGN PATENT DOCUMENTS

| | | |
|---|---|---|
| CA | 2 812 251 A1 | 4/2012 |
| EP | 1 145 766 A2 | 10/2001 |

(Continued)

OTHER PUBLICATIONS

Non-Final Office Action mailed Sep. 11, 2014, for U.S. Appl. No. 13/298,510, of Lamba, K. et al., filed Nov. 17, 2011.

(Continued)

*Primary Examiner* — Thien M Le
*Assistant Examiner* — Asifa Habib
(74) *Attorney, Agent, or Firm* — Novak Druce Connolly Bove + Quigg LLP

(57) ABSTRACT

The subject technology relates to methods and systems for processing a payment using a mobile card reader. Implementations of the subject technology provide a method for receiving payment information, wherein the payment information specifies a payment amount, generating an authorization request to process the payment information, encrypting the authorization request using an encryption engine to generate a secure authorization request and transmitting the secure authorization request using the radio transceiver to a payment processor via a messaging service, wherein the messaging service comprises one or more of a SMS, a MMS or an email service. In certain aspects, methods of the subject technology can further include steps for receiving an authorization response from the payment processor via the messaging service. Systems and methods for mobile card reader activation are also provided.

20 Claims, 8 Drawing Sheets

(56) References Cited

U.S. PATENT DOCUMENTS

| | | |
|---|---|---|
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,764,742 A | 6/1998 | Howard et al. |
| 5,850,599 A | 12/1998 | Seiderman |
| 5,878,337 A | 3/1999 | Joao et al. |
| 5,945,654 A | 8/1999 | Huang |
| 5,991,749 A | 11/1999 | Morrill, Jr. |
| D417,442 S | 12/1999 | Butts et al. |
| 6,006,109 A | 12/1999 | Shin |
| 6,021,944 A | 2/2000 | Arakaki |
| 6,032,859 A | 3/2000 | Hughes et al. |
| 6,061,666 A | 5/2000 | Do et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,363,139 B1 | 3/2002 | Zurek et al. |
| 6,400,517 B1 | 6/2002 | Murao |
| 6,431,445 B1 | 8/2002 | Deland et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| D477,321 S | 7/2003 | Baughman |
| 6,612,488 B2 | 9/2003 | Suzuki |
| 6,813,608 B1 | 11/2004 | Baranowski |
| 6,832,721 B2 | 12/2004 | Fujii |
| 6,850,147 B2 | 2/2005 | Prokoski et al. |
| 6,868,391 B1 | 3/2005 | Hultgren |
| 6,896,182 B2 | 5/2005 | Sakaguchi |
| 6,944,782 B2 | 9/2005 | von Mueller et al. |
| 6,979,231 B2 | 12/2005 | Shinohara |
| 7,003,316 B1 | 2/2006 | Elias et al. |
| 7,013,149 B2 | 3/2006 | Vetro et al. |
| 7,149,296 B2 | 12/2006 | Brown et al. |
| 7,167,711 B1 | 1/2007 | Dennis |
| 7,252,232 B2 | 8/2007 | Fernandes et al. |
| 7,309,012 B2 | 12/2007 | Von Mueller et al. |
| 7,324,836 B2 | 1/2008 | Steenstra et al. |
| 7,363,054 B2 | 4/2008 | Elias et al. |
| D575,056 S | 8/2008 | Tan |
| 7,409,234 B2 | 8/2008 | Glezerman |
| 7,424,732 B2 | 9/2008 | Matsumoto et al. |
| 7,433,452 B2 | 10/2008 | Taylor et al. |
| 7,505,762 B2 | 3/2009 | Onyon et al. |
| 7,506,812 B2 | 3/2009 | von Mueller et al. |
| D590,828 S | 4/2009 | Sherrod et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| D607,000 S | 12/2009 | Cheng et al. |
| 7,703,676 B2 | 4/2010 | Hart et al. |
| 7,708,189 B1 | 5/2010 | Cipriano |
| 7,757,953 B2 | 7/2010 | Hart et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,945,494 B2 | 5/2011 | Williams |
| 8,011,587 B2 | 9/2011 | Johnson et al. |
| 8,015,070 B2 | 9/2011 | Sinha et al. |
| D646,264 S | 10/2011 | Dong |
| D653,664 S | 2/2012 | Turnbull et al. |
| 8,132,670 B1 | 3/2012 | Chen |
| 8,231,055 B2 | 7/2012 | Wen |
| 8,297,507 B2 | 10/2012 | Kayani |
| 8,302,860 B2 | 11/2012 | McKelvey |
| 8,336,771 B2 | 12/2012 | Tsai et al. |
| D675,618 S | 2/2013 | Behar et al. |
| 8,376,239 B1 | 2/2013 | Humphrey |
| D677,667 S | 3/2013 | Smith et al. |
| D679,714 S | 4/2013 | Smith et al. |
| D680,537 S | 4/2013 | Miller et al. |
| 8,413,901 B2 | 4/2013 | Wen |
| 8,452,004 B2 | 5/2013 | Lee |
| D686,208 S | 7/2013 | Miller et al. |
| 8,500,010 B1 | 8/2013 | Marcus et al. |
| 8,500,018 B2 | 8/2013 | McKelvey et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| D700,606 S | 3/2014 | Lo |
| 8,662,389 B2 | 3/2014 | Dorsey et al. |
| 8,678,277 B2 | 3/2014 | Dorsey et al. |
| D703,211 S | 4/2014 | Weller et al. |
| 8,701,996 B2 | 4/2014 | Dorsey et al. |
| 8,701,997 B2 | 4/2014 | Dorsey et al. |
| D706,266 S | 6/2014 | Rotsaert |
| 8,740,072 B1 | 6/2014 | Dorogusker |
| 8,763,900 B2 | 7/2014 | Marcus et al. |
| D711,876 S | 8/2014 | McWilliam et al. |
| 8,794,517 B1 | 8/2014 | Templeton et al. |
| D712,892 S | 9/2014 | Hong et al. |
| 8,820,650 B2 | 9/2014 | Wilson et al. |
| 8,840,017 B2 | 9/2014 | Chan et al. |
| 8,840,024 B2 | 9/2014 | McKelvey et al. |
| 8,870,070 B2 | 10/2014 | McKelvey et al. |
| 8,870,071 B2 | 10/2014 | McKelvey |
| 8,876,003 B2 | 11/2014 | McKelvey |
| 8,910,868 B1 | 12/2014 | Wade et al. |
| 8,931,699 B1 | 1/2015 | Wade et al. |
| D724,094 S | 3/2015 | Blochinger et al. |
| D725,655 S | 3/2015 | Debaigue et al. |
| 8,967,465 B1 | 3/2015 | Wade et al. |
| D726,171 S | 4/2015 | Edwards |
| 9,016,570 B1 | 4/2015 | Gluck |
| 9,016,572 B2 | 4/2015 | Babu et al. |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| D740,820 S | 10/2015 | Templeton et al. |
| 2001/0001856 A1 | 5/2001 | Gould et al. |
| 2002/0002507 A1 | 1/2002 | Hatakeyama |
| 2002/0017568 A1 | 2/2002 | Grant et al. |
| 2002/0030871 A1 | 3/2002 | Anderson et al. |
| 2002/0073304 A1 | 6/2002 | Marsh et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Yuan |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1* | 6/2004 | Bailey ................ 235/439 |
| 2004/0127256 A1 | 7/2004 | Goldthwaite et al. |
| 2004/0128256 A1 | 7/2004 | Dhanjal et al. |
| 2004/0151026 A1 | 8/2004 | Naso et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2005/0009004 A1 | 1/2005 | Xu et al. |
| 2005/0010702 A1 | 1/2005 | Saito et al. |

(56) References Cited

U.S. PATENT DOCUMENTS

| | | |
|---|---|---|
| 2005/0077870 A1 | 4/2005 | Ha et al. |
| 2005/0156037 A1 | 7/2005 | Wurzburg |
| 2005/0156038 A1 | 7/2005 | Wurzburg |
| 2005/0194452 A1 | 9/2005 | Nordentoft et al. |
| 2005/0209719 A1 | 9/2005 | Beckert et al. |
| 2005/0219728 A1 | 10/2005 | Durbin et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0049255 A1 | 3/2006 | Von Mueller et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1* | 12/2007 | Wang .................. G06Q 10/087 455/556.1 |
| 2008/0017712 A1 | 1/2008 | Hart et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lane |
| 2008/0147564 A1 | 6/2008 | Singhal |
| 2008/0172306 A1 | 7/2008 | Schorr et al. |
| 2008/0177662 A1 | 7/2008 | Alton et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0187492 A1 | 7/2009 | Hammad et al. |
| 2010/0063893 A1 | 3/2010 | Townsend |
| 2010/0108762 A1 | 5/2010 | Morley, Jr. |
| 2010/0127857 A1 | 5/2010 | Kilmurray et al. |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0289390 A1 | 11/2010 | Kenney |
| 2010/0314446 A1 | 12/2010 | Morley, Jr. |
| 2011/0033910 A1 | 2/2011 | Maho et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0137803 A1 | 6/2011 | Willins |
| 2011/0161235 A1 | 6/2011 | Beenau et al. |
| 2011/0165896 A1* | 7/2011 | Stromberg et al. .......... 455/466 |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011024 A1 | 1/2012 | Dorsey et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0095869 A1 | 4/2012 | McKelvey |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2013/0031003 A1 | 1/2013 | Dorsey et al. |
| 2013/0031004 A1 | 1/2013 | Dorsey et al. |
| 2013/0087614 A1 | 4/2013 | Limtao et al. |
| 2013/0137367 A1 | 5/2013 | Fisher |
| 2013/0200147 A1 | 8/2013 | Dorsey et al. |
| 2013/0200148 A1 | 8/2013 | Dorsey et al. |
| 2013/0200149 A1 | 8/2013 | Dorsey et al. |
| 2013/0200153 A1 | 8/2013 | Dorsey et al. |
| 2013/0200154 A1 | 8/2013 | Dorsey et al. |
| 2013/0204788 A1 | 8/2013 | Dorsey et al. |
| 2013/0204791 A1 | 8/2013 | Dorsey et al. |
| 2013/0204792 A1 | 8/2013 | Dorsey et al. |
| 2013/0207481 A1 | 8/2013 | Gobburu et al. |
| 2013/0254117 A1 | 9/2013 | von Mueller et al. |
| 2013/0254118 A1 | 9/2013 | Dorsey et al. |
| 2013/0304244 A1 | 11/2013 | Ojanpera |
| 2013/0320089 A1 | 12/2013 | Marcus et al. |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0018016 A1 | 1/2014 | Chang et al. |
| 2014/0061301 A1 | 3/2014 | Cho et al. |
| 2014/0076964 A1 | 3/2014 | Morley, Jr. |
| 2014/0089205 A1 | 3/2014 | Kapur et al. |
| 2014/0097242 A1 | 4/2014 | McKelvey |
| 2014/0124576 A1 | 5/2014 | Zhou et al. |
| 2014/0131442 A1 | 5/2014 | Morrow et al. |
| 2014/0144983 A1 | 5/2014 | Dorsey et al. |
| 2014/0203082 A1 | 7/2014 | Huh |
| 2015/0149992 A1 | 5/2015 | Wade et al. |
| 2015/0161419 A1 | 6/2015 | Wade et al. |
| 2015/0199677 A1 | 7/2015 | Wade et al. |

FOREIGN PATENT DOCUMENTS

| | | |
|---|---|---|
| JP | 2003-108777 A | 4/2003 |
| JP | 2004-078662 A | 3/2004 |
| JP | 2005-063869 A | 3/2005 |

(56) References Cited

FOREIGN PATENT DOCUMENTS

| JP | 2005-242550 A | 9/2005 |
|---|---|---|
| JP | 2005-269172 A | 9/2005 |
| JP | 2009-199649 A | 9/2009 |
| JP | 2001-313714 A | 11/2011 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 | 9/2010 |
| WO | 2010/135174 A1 | 11/2010 |
| WO | 2013/009891 A1 | 1/2013 |

OTHER PUBLICATIONS

Final Office Action mailed May 6, 2015, for U.S. Appl. No. 13/298,510, of Lamba, K. et al., filed Nov. 17, 2011.
Final Office Action mailed Jul. 9, 2012, for U.S. Appl. No. 13/005,822, of McKelvey, J., et al., filed Jan. 13, 2011.
Non-Final Office Action mailed Jun. 18, 2013, for U.S. Appl. No. 13/005,822, of McKelvey, J., et al., filed Jan. 13, 2011.
Non-Final Office Action mailed Dec. 10, 2013, for U.S. Appl. No. 13/005,822 of McKelvey, J., et al., filed Jan. 13, 2011.
Non-Final Office Action mailed Oct. 7, 2011, for U.S. Appl. No. 13/043,258, of McKelvey, J., filed Mar. 8, 2011.
Final Office Action mailed Jul. 13, 2012, for U.S. Appl. No. 13/043,258, of McKelvey, J., filed Mar. 8, 2011.
Non-Final Office Action mailed Dec. 11, 2013, for U.S. Appl. No. 13/043,258, of McKelvey, J., filed Mar. 8, 2011.
Notice of Allowance mailed Jul. 1, 2014, for U.S. Appl. No. 13/043,258, of McKelvey, J., filed Mar. 8, 2011.
Advisory Action mailed Aug. 15, 2012, for U.S. Appl. No. 13/043,258, of McKelvey, J., filed Mar. 8, 2011.
Advisory Action mailed Aug. 17, 2012, for U.S. Appl. No. 13/005,822, of McKelvey, J.,et al., filed Jan. 13, 2011.
Notice of Allowance mailed Jun. 24, 2014, for U.S. Appl. No. 13/005,822, of McKelvey, J., et al., filed Jan. 13, 2011.
Non-Final Office Action mailed Oct. 7, 2014, for U.S. Appl. No. 13/298,534, of Lamba, K., et al., filed Nov. 17, 2011.
Final Office Action mailed Apr. 8, 2015, for U.S. Appl. No. 13/298,534, of Lamba, K., et al., filed Nov. 17, 2011.
Final Office Action mailed Sep. 6, 2013, for U.S. Appl. No. 13/298,560, of Lamba K. et al., filed Nov. 17, 2011.
Advisory Action mailed Oct. 21, 2013, for U.S. Appl. No. 13/298,560 of Lamba K. et al., filed Nov. 17, 2011.
Final Office Action mailed Aug. 15, 2013, for U.S. Appl. No. 13/043,263, of McKelvey, J., filed Mar. 8, 2011.
Advisory Action mailed Nov. 8, 2013, for U.S. Appl. No. 13/043,263, of McKelvey, J., filed Mar. 8, 2011.
Non-Final Office Action mailed Feb. 24, 2014, for U.S. Appl. No. 13/043,263, of McKelvey, J., filed Mar. 8, 2011.
Notice of Allowance mailed Jul. 15, 2014, for U.S. Appl. No. 13/043,263, of McKelvey, J., filed Mar. 8, 2011.
Non-Final Office Action mailed Jul. 22, 2014, for U.S. Appl. No. 13/298,560, of Lamba K. et al., filed Nov. 17, 2011.
Final Office Action mailed Jan. 28, 2015, for U.S. Appl. No. 13/298,560, of Lamba K. et al., filed Nov. 17, 2011.
Non-Final Office Action mailed Oct. 11, 2011, for U.S. Appl. No. 13/043,203, of McKelvey. J., et al., filed Mar. 8, 2011.
Final Office Action mailed Jul. 6, 2012, for U.S. Appl. No. 13/043,203, of McKelvey. J., et al., filed Mar. 8, 2011.
Non-Final office Action mailed Oct. 11, 2011, for U.S. Appl. No. 13/043,263, of McKelvey, J., filed Mar. 8, 2011.
Advisory Action mailed Aug. 1, 2012, for U.S. Appl. No. 13/043,203, of McKelvey, J., filed Mar. 8, 2011.
Advisory Action mailed Aug. 16, 2012, for U.S. Appl. No. 13/043,263, of McKelvey, J., filed Mar. 8, 2011.
Non-Final Office Action mailed Apr. 29, 2013, for U.S. Appl. No. 13/043,263, of McKelvey, J., filed Mar. 8, 2011.
Non-Final office Action mailed Apr. 30, 2013, for U.S. Appl. No. 13/043,203, of McKelvey, J., filed Mar. 8, 2011.
Non-Final Office Action mailed May 28, 2013, for U.S. Appl. No. 13/298,560, of Lamba K. et al., filed Nov. 17, 2011.
Notice of Allowance mailed Jul. 9, 2013, for U.S. Appl. No. 13/043,203, of McKelvey, J., filed Mar. 8, 2011.
Non-Final Office Action mailed Jul. 6, 2015, for U.S. Appl. No. 13/298,534, of Lamba K. et al., filed Nov. 17, 2011.
Advisory Action mailed Apr. 9, 2015, for U.S. Appl. No. 13/298,560, of Lamba K. et al., filed Nov. 17, 2011.
Final office Action mailed Jul. 9, 2012, for U.S. Appl. No. 13/043,263, of McKelvey, J., filed Mar. 8, 2011.
Non-Final Office Action mailed Jul. 16, 2015, for U.S. Appl. No. 13/298,560, of Lamba K. et al., filed Nov. 17, 2011.
Application for Registration of an Industrial Design Examiner's Report for Canadian Design Application No. 159528, mailed Jun. 11, 2015.
English-language translation of Notice of Reasons for Rejection for Japanese Application No. 2014-0255525, mailed Mar. 31, 2015.
Certificate of Registration of Design for Indian Design Application No. 267386 mailed Nov. 14, 2014 (Registration No. 39149).
Non-Final Office Action mailed Jul. 27, 2015, for U.S. Appl. No. 29/493,212, of Edwards, T., et al., filed Jun. 6, 2014.
English-language translation of Decision of Final Rejection for Japanese Patent Application No. 2013-533897, mailed Feb. 23, 2015.
English-language translation of Office Action for Japanese Patent Application No. 2013-533897, mailed Jun. 5, 2014.
English-language translation of Search Report for Japanese Patent Application No. 2013-533897, mailed Apr. 14, 2014.
Certificate of Design Registration for European Patent Application No. 002578674, mailed Nov. 14, 2014 (Registration No. 002578674-0001).
Notice of Allowance mailed Sep. 2, 2015, for U.S. Appl. No. 14/578,107, of Wade, J. et al., filed Dec. 19, 2014.
Advisory Action mailed Aug. 24, 2012, for U.S. Appl. No. 13/010,976, of Babu, A. R., et al., filed Jan. 21, 2011.
Non-Final Office Action mailed Aug. 15, 2014, for U.S. Appl. No. 13/010,976, of Babu, A. R., et al., filed Jan. 21, 2011.
Notice of Allowance mailed Dec. 24, 2014, for U.S. Appl. No. 13/010,976, of Babu, A. R., et al., filed Jan. 21, 2011.
Non-Final Office Action mailed Apr. 2, 2014, for U.S. Appl. No. 14/012,655, of McKelvey, J., filed Aug. 28, 2013.
Final Office Action mailed Aug. 15, 2014, for U.S. Appl. No. 14/012,655, of McKelvey, J., filed Aug. 28, 2013.
Non-Final Office Action mailed Jan. 20, 2015, for U.S. Appl. No. 14/012,655, of McKelvey, J., filed Aug. 28, 2013.
Notice of Allowance mailed Sep. 1, 2015, for U.S. Appl. No. 13/298,487, of Babu, A., et al., filed Nov. 17, 2011.
Non-Final Office Action mailed Apr. 29, 2013, for U.S. Appl. No. 13/298,487, of Babu, A., et al., filed Nov. 17, 2011.
Final Office Action mailed Aug. 22, 2013, for U.S. Appl. No. 13/298,487, of Babu, A., et al., filed Nov. 17, 2011.
Advisory Action mailed Oct. 22, 2013, for U.S. Appl. No. 13/298,487, of Babu, A., et al., filed Nov. 17, 2011.
Non-Final Office Action mailed Aug. 21, 2014, for U.S. Appl. No. 13/298,487, of Babu, A., et al., filed Nov. 17, 2011.
Final Office Action mailed Mar. 18, 2015, for U.S. Appl. No. 13/298,487, of Babu, A., et al., filed Nov. 17, 2011.
Non-Final Office Action mailed Feb. 20, 2015, for U.S. Appl. No. 14/512,104, of Templeton, T., et al., filed Oct. 10, 2014.
International Search Report and Written Opinion for PCT Application No. PCT/US2010/052483, mailed Jun. 10, 2011.
International Search Report and Written Opinion for PCT Application No. PCT/US2011/055386, mailed Feb. 22, 2012.
European Search Report and Opinion for European Application No. 11833172.7, mailed Apr. 22, 2014.
International Search Report and Written Opinion for PCT Application No. PCT/US2014/069788, mailed May 14, 2015.

(56) References Cited

OTHER PUBLICATIONS

International Search Report and Written Opinion for PCT Application No. PCT/US2012/064782, mailed Feb. 26, 2013.
International Search Report and Written Opinion for PCT Application No. PCT/US2010/052481, mailed Jun. 23, 2011.
International Search Report and Written Opinion for PCT Application No. PCT/US2014/067074, mailed Mar. 15, 2015.
Examination Report for Canadian Application No. 2,812,594, mailed on Feb. 24, 2015.
Examination Report No. 1 for Australian Application No. 201415781, mailed on Feb. 23, 2015 (Registration No. 359005).
"Review: Square, Inc. Square Credit Card Reader (2013)," iLounge, Retrieved from the Internet URL: http://www.ilounge.com/index.php/reviews/entry/sqaure-inc.-square-credit-card-reader-2013/, on Jan. 16, 2014, pp. 3.
"Tuaw the Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.
Examination Report No. 2 for Australian Application No. 201415781, mailed Aug. 13, 2015 (Registration No. 359005).
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Notification of Registration of a Design for Australian Application No. 201415781, mailed on Nov. 27, 2014 (Registration No. 359005).
First Examination Report for Indian Design Application No. 267386, mailed Feb. 5, 2015.
Non-Final Office Action mailed Apr. 25, 2013, for U.S. Appl. No. 13/298,491, of Lamba, K., et al., filed Nov. 17, 2011.
Final Office Action mailed Sep. 17, 2013, for U.S. Appl. No. 13/298,491, of Lamba, K, et al., filed Nov. 17, 2011.
Advisory Action mailed Oct. 22, 2013, for U.S. Appl. No. 13/298,491, of Lamba, K., et al., filed Nov. 17, 2011.
Non-Final Office Action mailed Jul. 17, 2014, for U.S. Appl. No. 13/298,491, of Lamba, K., et al., filed Nov. 17, 2011.
Final Office Action mailed Feb. 4, 2015, for U.S. Appl. No. 13/298,491, of Lamba, K., et al., filed Nov. 17, 2011.
Notice of Allowance mailed Jun. 22, 2015, for U.S. Appl. No. 13/298,491, of Lamba, K., et al., filed Nov. 17, 2011.
Non-Final Office Action mailed Jun. 6, 2014, for U.S. Appl. No. 14/231,598, of Wade, J., et al., filed Mar. 31, 2014.
Notice of Allowance mailed Nov. 25, 2014, for U.S. Appl. No. 14/231,598, of Claude, J.B., et al., filed Mar. 31, 2014.
Non-Final Office Action mailed Jun. 22, 2015, for U.S. Appl. No. 14/322,815, of Edwards, T., filed Jul. 2, 2014.
Notice of Allowance mailed Aug. 1, 2014, for U.S. Appl. No. 14/203,463, of Wade, J., et al., filed Mar. 10, 2014.
Notice of Allowance mailed Aug. 27, 2015, for U.S. Appl. No. 13/298,501, of Babu, A., et al., filed Nov. 17, 2011.
Non-Final Office Action mailed Sep. 11, 2014, for U.S. Appl. No. 13/298,501, of Babu, A., et al., filed Nov. 17, 2011.
Final Office Action mailed May 6, 2015, for U.S. Appl. No. 13/298,501, of Babu, A., et al., filed Nov. 17, 2011.
Notice of Allowance mailed Oct. 17, 2014, for U.S. Appl. No. 14/220,967, of Wade, J., et al., filed Mar. 20, 2014.
Notice of Allowance mailed Dec. 18, 2014, for U.S. Appl. No. 14/220,967, of Wade, J., et al., filed Mar. 20, 2014.
Notice of Allowance mailed May 19, 2015, for U.S. Appl. No. 14/620,765, of Wade, J., et al., filed Feb. 12, 2015.
Non-Final Office Action mailed May 26, 2015, for U.S. Appl. No. 14/551,681, of Wade, J., et al., filed Nov. 24, 2014.
Notice of Allowance mailed Jun. 10, 2014, for U.S. Appl. No. 29/491,147, of Templeton T., et al., filed May 16, 2014.
Non-Final Office Action mailed Sep. 11, 2014, for U.S. Appl. No. 13/298,506, of Lamba, K., et al., filed Nov. 17, 2011.
Final Office Action mailed May 6, 2015, for U.S. Appl. No. 13/298,506, of Lamba, K., et al., filed Nov. 17, 2011.

Non-Final Office Action mailed Sep. 30, 2011, for U.S. Appl. No. 13/005,822, of McKelvey, J., et al., filed Jan. 13, 2011.
Notice of Allowance mailed Aug. 28, 2015, for U.S. Appl. No. 13/298,510, of Lamba, K. et al., filed Nov. 17, 2011.
Advisory Action mailed Sep. 11, 2015 for U.S. Appl. No. 13/298,506, of Lamba, K., et al., filed Nov. 17, 2011.
Notice of Allowance mailed Sep. 16, 2015 for U.S. Appl. No. 14/551,681, of Wade, J., et al., filed Nov. 24, 2014.
Notice of Allowance mailed Oct. 5, 2015 for U.S. Appl. No. 14/322,815, of Edwards, T., filed Jul. 2, 2014.
Notice of Allowance mailed Oct. 6, 2015 for U.S. Appl. No. 13/298,491, of Lamba, K., et al., filed Nov. 17, 2011.
Notice of Allowance mailed Oct. 7, 2015 for U.S. Appl. No. 13/298,510, of Lamba, K., et al., filed Nov. 17, 2011.
Notice of Allowance mailed Oct. 8, 2015 for U.S. Appl. No. 13/298,487, of Lamba, K., et al., filed Nov. 17, 2011.
Notice of Allowance mailed Oct. 13, 2015 for U.S. Appl. No. 14/578,107, of Wade, J. et al., filed Dec. 19, 2014.
Non-Final Office Action mailed Oct. 29, 2015 for U.S. Appl. No. 14/512,104, of Templeton, T., et al., filed Oct. 10, 2014.
Non-Final Office Action mailed Nov. 21, 2013, for U.S. Appl. No. 14/052,009, of Wilson, M., et al., filed Oct. 11, 2013.
Non-Final Office Action mailed Jul. 19, 2012, for U.S. Appl. No. 12/903,758, of Wilson, M., et al., filed Oct. 13, 2010.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Padilla, L., "Magnetic stripe reader circuit," Jan. 28, 1997, Retrieved from the Internet URL: http://www.gae.ucm.es/~padillatextrawork/magamp.html, on May 5, 2011, pp. 1-7.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Travel industry targeted for Palm PDA card reader, Retrieved from the Internet URL: http://www.m-travel.com/news/2001/08/travel_industry.html, on Apr. 19, 2011, pp. 1-2.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.

(56) References Cited

OTHER PUBLICATIONS

"Mophie Marketplace Magnetic Strip Reader/Case for iPhone 3G & 3GS-Grey," J&R (JR.com), Retrieved from the Internet URL: http://www.jr.com/mophie/pe/MPE_MPIP3GBLK, on Feb. 8, 2011, pp. 1-1.

"Barcode scanner and Magnetic Stripe Reader (MSR) for Pocke..," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards-.., on Feb. 8, 2011, pp. 1-3.

Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.

"Arduino magnetic stripe decoder," Instructables, Retrieved from the Internet URL: http://www.instructables.com/id/Arduino-magneticstripe-decorder/, on Feb. 8, 2011, pp. 1-5.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.

"Pay@PC," Retrieved from the Internet URL: http://www.merchantanywhere.com/PAY_AT_PCT@PC.htm, on Feb. 11, 2011, pp. 1-2.

"Get paid on the spot from your mobile phone," Retrieved from the Internet URL: http://payments.intuit.com/products/basic-payment-solutions/mobile-credit-card-processin.., on Feb. 11, 2011, pp. 1-3.

"Touch-Pay Wireless Credit Card Processing," MerchantSeek, Retrieved from the Internet URL: http://www.merchantseek.com/wireless-credit-card-processing.htm, on Feb. 11, 2011, pp. 1-5.

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.

Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.

Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.

"Headphone Jack (3.5mm)," Retrieved from the Internet URL: http://www.phonescoop.com/glossary/term.php?gid=440, on May 5, 2011, pp. 1-1.

"2.5mm Headset Jack," Retrieved from the Internet URL: http://www.phonescoop.com/glossary/term.php?gid=360, on May 5, 2011, pp. 1-1.

"Reference Designations for Electrical and Electronics Parts and Equipment," Engineering Drawing and Related Documentation Practices, ASME Y14.44/2008, The American Society of Mechanical Engineers, Nov. 21, 2008, pp. 1-31.

Acidus, "Mag-stripe Interfacing—A Lost Art," Retrieved from the Internet URL: http://www.scribd.com/doc/18236182/Magstripe-Interfacing#open_. . . , on Feb. 7, 2011, pp. 1-4.

"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.

Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.

Website: www.alexwinston.com, Aug. 31, 2009, pp. 1-5.

"Magnetic Card Reader," lekernel.net~scrapbook, Retrieved from the Internet URL: http://lekernel.net/scrapbook/old/cardreader.html, on Apr. 25, 2011, pp. 1-4.

"Magnetic stripe reader/writer," Retrieved from the Internet URL: http://www.gae.ucm.es/~padilla/extrawork/stripe.html, on Dec. 21, 2009, pp. 1-2.

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.

Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.

European Search Report and Opinion for European Patent Application No. 11 786 731.7, mailed Mar. 28, 2014.

Office Action for European Patent Application No. 11 786 731.7, mailed Jul. 16, 2015.

Non-Final Office Action mailed Sep. 30, 2011 for U.S. Appl. No. 12/903,753, of McKelvey, J., et al., filed Oct. 13, 2010.

Final Office Action mailed Jul. 6, 2012 for U.S. Appl. No. 12/903,753, of McKelvey, J., et al., filed Oct. 13, 2010.

Non-Final Office Action mailed Jul. 8, 2013 for U.S. Appl. No. 12/903,753, of McKelvey, J., et al., filed Oct. 13, 2010.

Notice of Allowance mailed Oct. 10, 2013, for U.S. Appl. No. 12/903,753, of Mckelvey, J., filed Oct. 13, 2010.

Final Office Action mailed Apr. 24, 2013 for U.S. Appl. No. 12/903,758, of Wilson, M., et al., filed Oct. 13, 2010.

Notice of Allowance mailed Aug. 6, 2013 for U.S. Appl. No. 12/903,758, of Wilson, M., et al., filed Oct. 13, 2010.

Notice of Allowance mailed Apr. 4, 2014 for U.S. Appl. No. 14/052,009, of Wilson, M., et al., filed Oct. 11, 2013.

Notice of Allowance mailed Jul. 30, 2014 for U.S. Appl. No. 14/052,009, of Wilson, M., et al., filed Oct. 11, 2013.

Non-Final Office Action mailed Sep. 30, 2011 for U.S. Appl. No. 13/010,976, of Babu, A. R., et al., filed Jan. 21, 2011.

Final Office Action mailed Jun. 12, 2012 for U.S. Appl. No. 13/010,976, of Babu, A. R., et al., filed Jan. 21, 2011.

* cited by examiner

MOBILE READER DEVICE

BACKGROUND

Mobile card readers facilitate financial transactions between parties, such as a buyer and a merchant, by providing a means by which funds can be transferred using a payment card, such as a debit or credit card. Along with the rising ubiquity of Internet access, mobile card readers have enjoyed increasing popularity as a location-agnostic and cost effective alternative to conventional payment card scanning devices.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form to avoid obscuring the concepts of the technology.

Some conventional mobile card readers have limited hardware functionality and rely on a host device, such as a smart phone or tablet PC, for full functionality. Such readers often contain only hardware for reading magnetic stripe information, but rely on a host device, for example, to provide the processing and communication capabilities needed for completing a financial transaction. However, supporting host device hardware (e.g., smart phones or a tablet PC) is relatively expensive, and includes hardware unnecessary for payment processing. Accordingly, there is a need for stand-alone mobile reader device, which includes activation and payment processing functionality, without reliance on a host device.

Figure 1A:
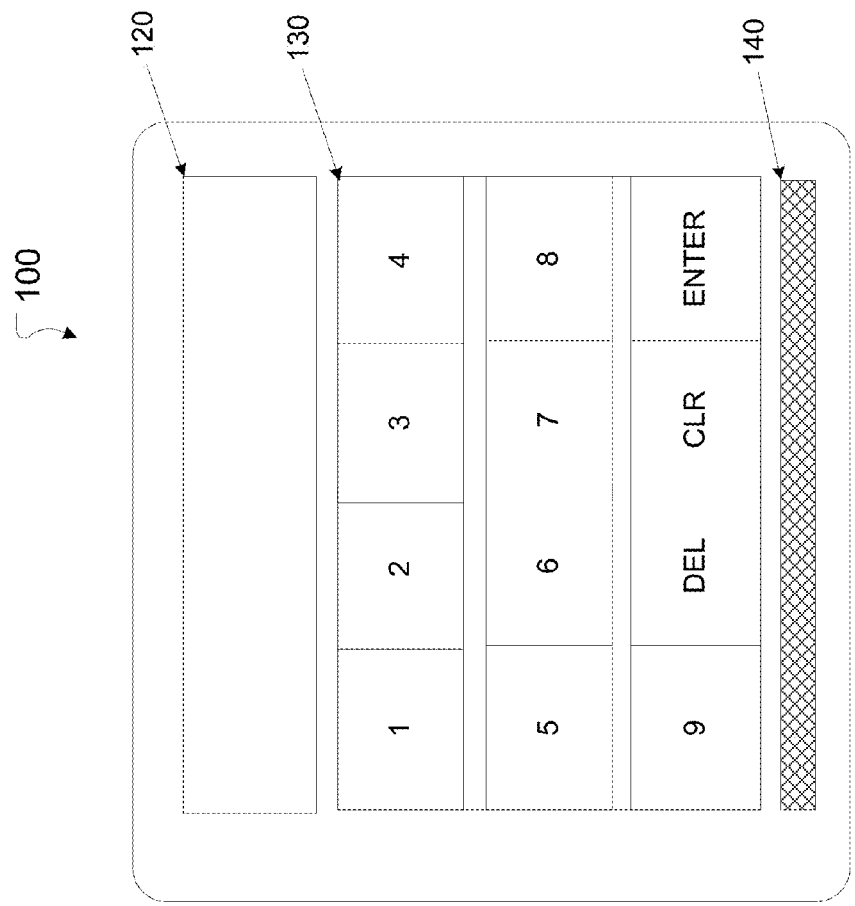
FIG. 1A illustrates a block diagram of an example mobile reader device, according to some aspects of the subject disclosure.

FIG. 1A illustrates a conceptual block diagram of hardware components of an example mobile card reader 100. As illustrated, mobile card reader 100 includes a display 120, input pad 130 and card slot 140. It is understood that mobile card reader 100 can include additional hardware components, such as additional display and/or input device(s), without departing from the scope of the invention. Display 120 and input pad 130 can be integrated into a common touch based display screen, such as a capacitive touch screen. Additionally, display and input functionality can be provided using one or more devices in wireless communication with mobile card reader 100, such as a local device, as will be discussed in further detail with respect to FIG. 1B, below.

In the example of FIG. 1A, card slot 140 is configured as a dip-slot, e.g., for accepting integrated circuit cards, such as those conforming to the Europay, Mastercard, and Visa (EMV) standard. However, card slot 140 can be configured for accepting other payment cards that differ in geometry and/or information storage format. By way of example, card slot 140 can be configured to accept a magnetic stripe payment card, such as a debit or credit card that must be "swiped" through card slot 140.

As further illustrated, input pad 130 includes numerical input keys, as well as control keys, such as a "delete" key (DEL), a "clear" key (CLR) and a return/enter key (ENTER). However, it is understood that input pad 130 can include a fewer (or greater) number of entry options than those shown in the example of FIG. 1A.

In operation, mobile card reader 100 can function as a stand-alone unit, not requiring functional support of a "host device" for full operability. As such, mobile card reader 100 includes all hardware and software modules necessary for activation of the unit, as well as subsequent processing of payment information (e.g., using a payment processing service), such as that read from a payment card using card slot 140 and/or input using input pad 130. As described in further detail below, mobile card reader 100 can be configured to choose amongst multiple different communication paths for wireless communication with a payment processing service, for example, in bandwidth constrained circumstances, e.g., using a messaging service such as short messaging service (SMS), multimedia messaging service (SMS), or an email service.

Figure 1B:
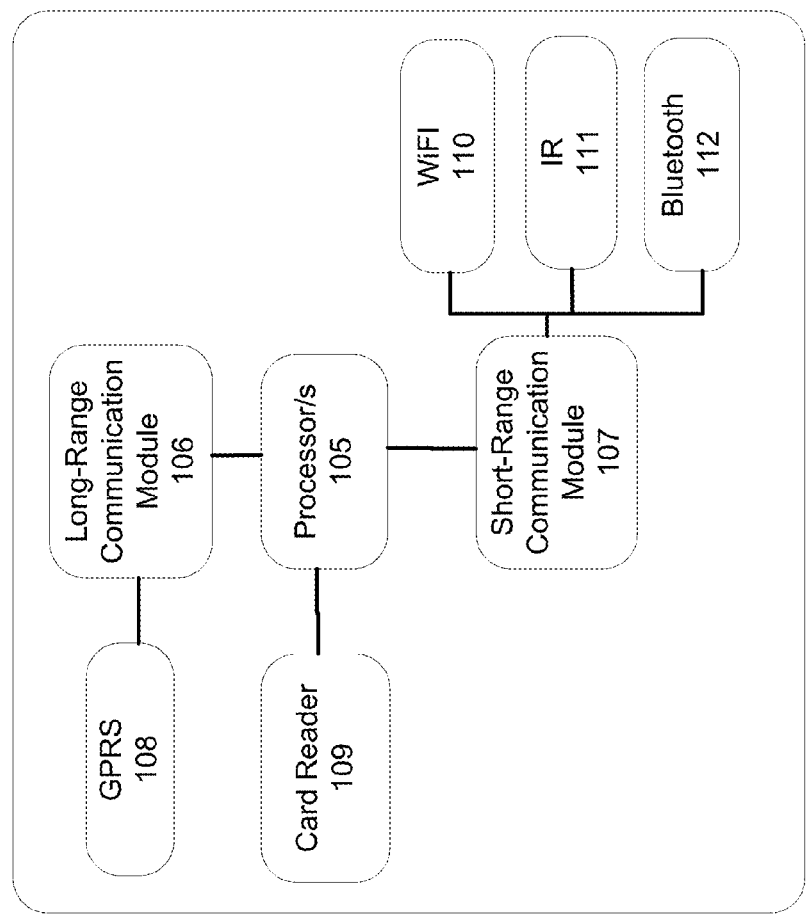
FIG. 1B illustrates a block diagram of example hardware modules in a reader device, according to some aspects of the disclosure.

FIG. 1B illustrates a block diagram of example hardware modules that support functionality of mobile reader device 100, according to some aspects of the disclosure. As illustrated, mobile reader device 100 includes processor/s 105, a long range communication module 106, a short-range communication module 107, and a reader 109. As further depicted, short-range communication module 107 includes various communication modules (e.g., for facilitating wireless communication over short distances), including: WiFi module 110, infrared (IR) module 111, and Bluetooth module 112.

Likewise, long-range communication module 106 includes a general packet radio service (GPRS) module to provide communication capabilities over greater distances, as compared to that of short-range communication module 107. In certain aspects, GPRS module 108 can facilitate communication with a cellular network, for example, using a 2G or 3G cellular communication system. Additionally, GPRS module 108 can be configured to provide communications over a wideband code division multiple access (WCDMA) mobile network. It is understood that short-range communication module 107 and/or long-range communication module 106 can include additional (or different) communication modules for supporting wireless communications to/from mobile card reader 100 and a communication network or local device.

In operation, financial information is received by mobile card reader 100 (using reader 109), when a payment card is inserted (or swiped) via card slot 140. Once financial information has been received (e.g., by processor/s 105), the availability and/or quality of one or more communication paths to a payment processing service are determined. Subsequently, an optimal communication path is selected for use in transacting data for the completion of a financial transaction, for example, between a buyer and a merchant.

In some implementations, wherein a high amount of bandwidth is available for communication between mobile card reader 100 and a payment processing service, long-range communication module 106 is used to transmit financial information to a payment processing service, for example, using a high-bandwidth transmission service. By way of example, the high-bandwidth transmission service may utilize a communication protocol supporting at least one of: an internet protocol (IP), a point-to-point protocol (PPP), or a X.25 protocol.

Alternatively, if communication with the payment processing service is bandwidth restricted, a low-bandwidth transmission service may be used to send/receive data via long-range communication module 106. By way of example, the low-bandwidth transmission service can utilize one or more of: a short messaging service (SMS), a multimedia messaging service (MMS), or an email service.

In some instances, an unusably low amount of bandwidth, or no bandwidth, is available for communication with the payment processing service, rendering mobile card reader 100 without a means for verifying/processing a financial transaction. In such cases, mobile card reader 100 can communicate with a proximate or nearby "local device" that is configured to facilitate communication with the payment processing service. For example, the local device may be a personal computer (PC) or other computing device having wireless (or wired) network resources that are not available to the mobile reader device.

Figure 1C:
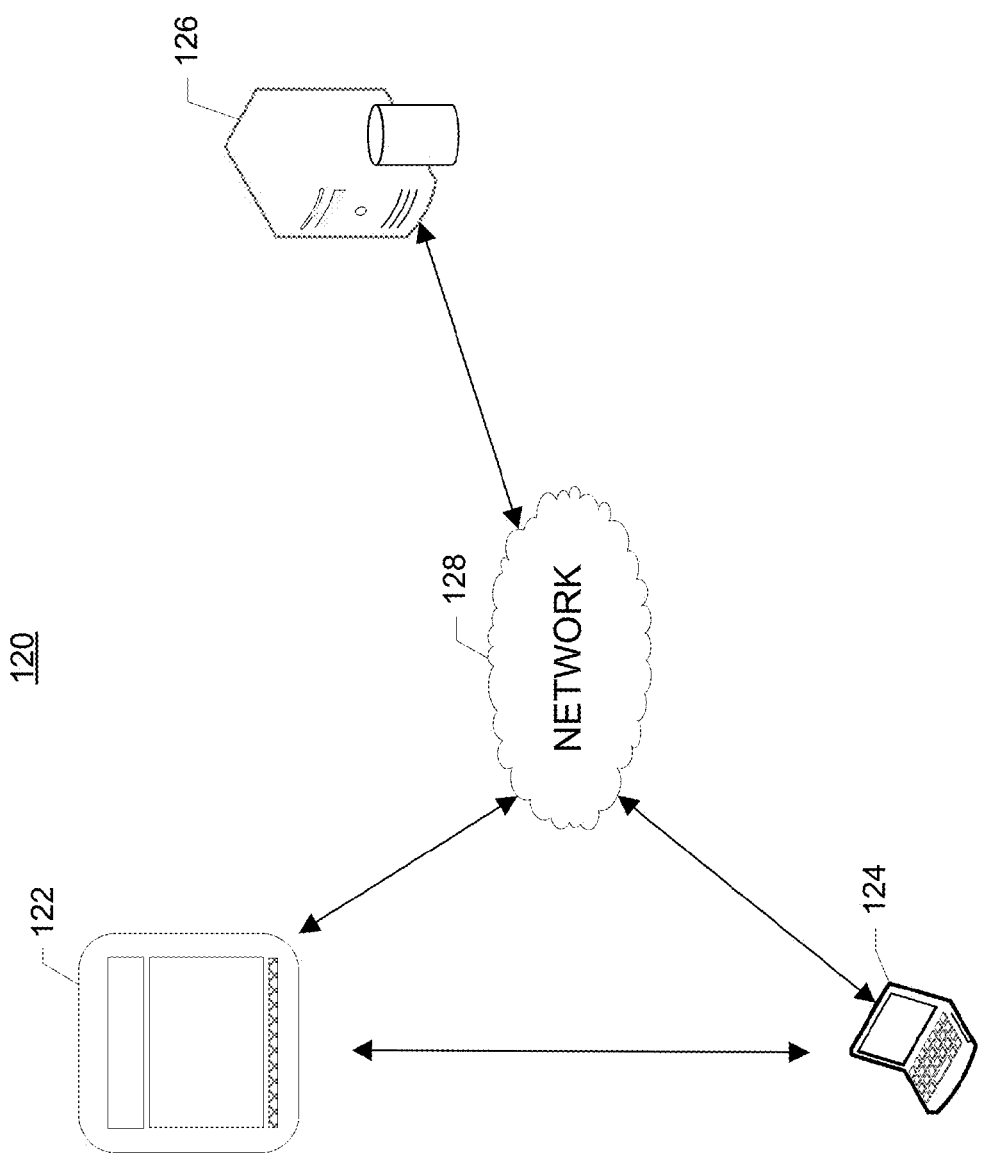
FIG. 1C illustrates an example of a network environment that includes a reader device, as well as a local device for facilitating communication with a payment processing service, according to some aspects of the technology.

FIG. 1C illustrates an example of a network environment 120 that includes a reader device, as well as a local device 124 for facilitating communication with a payment processing service 126. As illustrated, network environment 120 includes a mobile card reader 122, a local device 124, and a payment processing service 126, each of which are communicatively coupled via network 128. It is understood that network 128 can include, for example, any one or more of a personal area network (PAN), a local area network (LAN), a campus area network (CAN), a metropolitan area network (MAN), a wide area network (WAN), a broadband network (BBN), a cellular network, the Internet, and the like. Further, network 128 can include, but is not limited to, any one or more of the following network topologies, including a bus network, a star network, a ring network, a mesh network, a star-bus network, tree or hierarchical network, and the like.

In the example of FIG. 1C, local device 124 is illustrated as a personal computer, however, depending on the desired implementation, local device 124 can be any type of computing device configured to receive wireless communications (e.g., from mobile card reader 122), and to transact data with a payment processing service via network 128. By way of non-limiting example, local device 124 can include a tablet computing device, smartphone, workstation, or server, etc. Additionally, it is understood that payment processing service 126 can comprise a single computer, or a network of computers, such as a cluster, configured to receive and validate financial information, e.g., to facilitate a monetary transaction between a buyer and a seller.

As discussed in further detail below, local device 124 can be used to facilitate communication between mobile card reader 122 and payment processing service 126 when mobile card reader 122 is unable to communicate directly with a communications network for access to the payment processing service. However, in certain implementations, local device 124 is configured to support other types of functionality with regard to mobile card reader 122. For example, using one or more wireless communication modules (e.g., Bluetooth module 112, WiFi module 110, and/or IR module 111), mobile card reader 122 can communicate with local device 124 to receive text inputs (via a keyed entry method or device, such as a keyboard). In another aspect, local device 124 may provide display functionality, e.g., using a bistable display, for displaying information relative to a financial transaction performed using mobile card reader 122.

Figure 2:
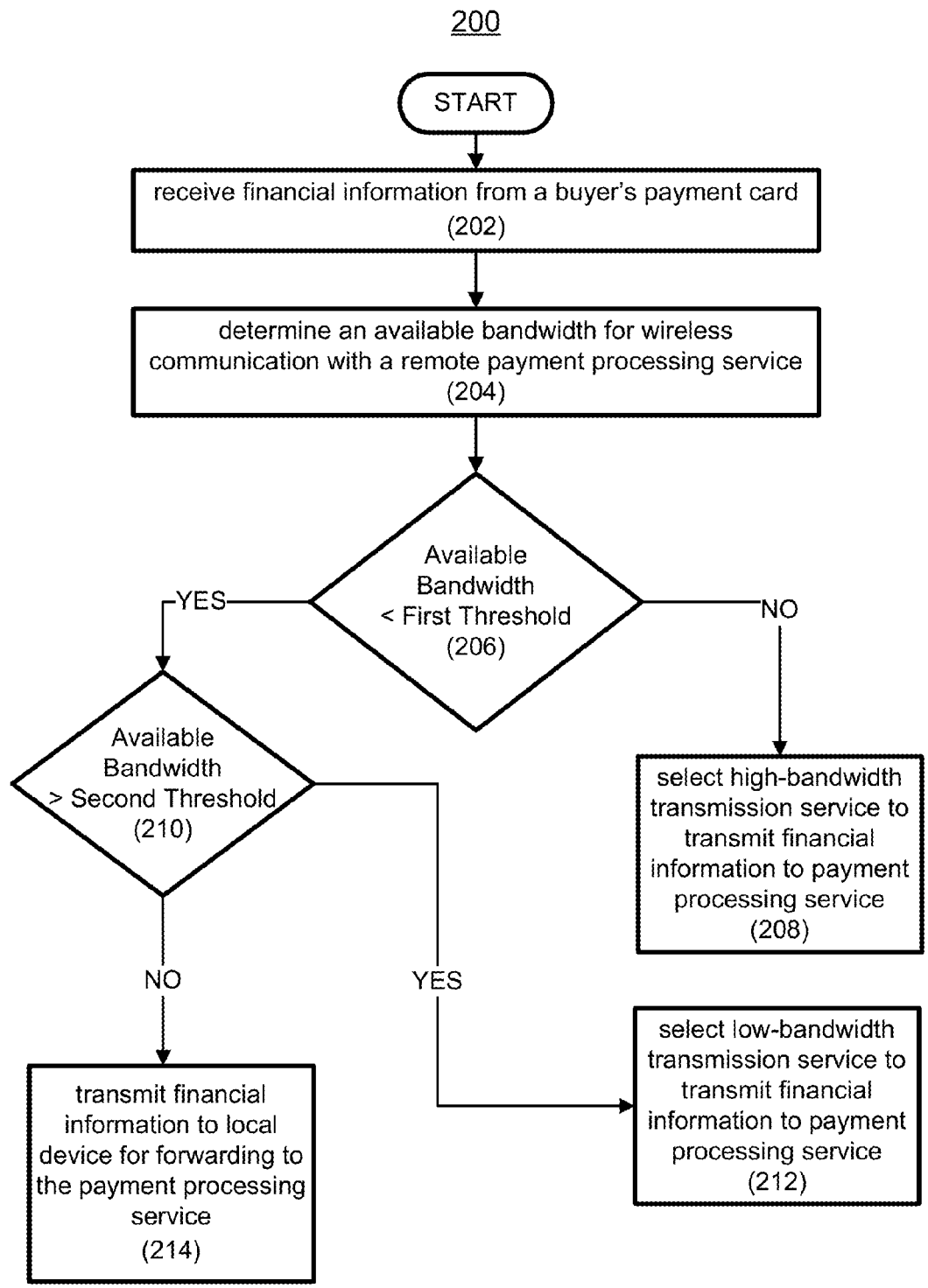
FIG. 2 illustrates an example process for processing a payment using a mobile card reader, according to some aspects of the technology.

FIG. 2 illustrates an example process 200 for selecting a communication channel for communication with a payment processing service. In the illustrated example, process 200 begins with step 202 when financial information is received (e.g., by one or more processors, such as processor/s 105), from a payment card. As discussed in further detail below, the financial information may be read from a magnetic stripe of a payment card (such as a debit or credit card), or the information may be read from an integrated circuit (IC) of a "chip" card, such as those conforming to the EMV standard.

Once the financial information has been received from the payment card, process 200 proceeds to step 204 in which an available bandwidth, or communication channel signal strength, is determined for communications between the mobile card reader and a payment service.

Subsequently, in step 206, a determination is made as to whether the available bandwidth falls below a first predetermined threshold. In certain aspects, the first predetermined threshold for bandwidth indicates a minimum preferred bandwidth for communication using a transmission service (protocols) that are better optimized for high speed network communications. If in step 206 it is determined that the available bandwidth is not below the first threshold, process 200 proceeds to step 208, wherein a high-bandwidth transmission service is selected for use in transacting payment processing information (including the financial information) with the payment processing service.

Alternatively, if in step 206 it is determined that the available bandwidth is below the first threshold, process 200 proceeds to step 210 wherein an additional determination is made as to whether the available bandwidth is greater than a second threshold. In some implementations, the second threshold indicates a minimum bandwidth requirement, below which an intermediary local device is used to facilitate communication with a payment processing service. As such, if in step 210 it is determined that the available bandwidth is greater than the second threshold, process 200 proceeds to step 212 in which a low-bandwidth transmission service is used for communication with the payment processing service. By way of non-limiting example, the low-bandwidth transmission service can include one or more of: a short messaging service (SMS), a multimedia messaging service (MMS), or an email service.

Alternatively, if in step 210 it is determined that the available bandwidth is not greater than the second threshold, process 200 proceeds to step 214 in which financial information is transmitted to a local device (e.g., local device 124), for use in verifying a financial transaction, for example, between a buyer and a merchant.

Figure 3A:
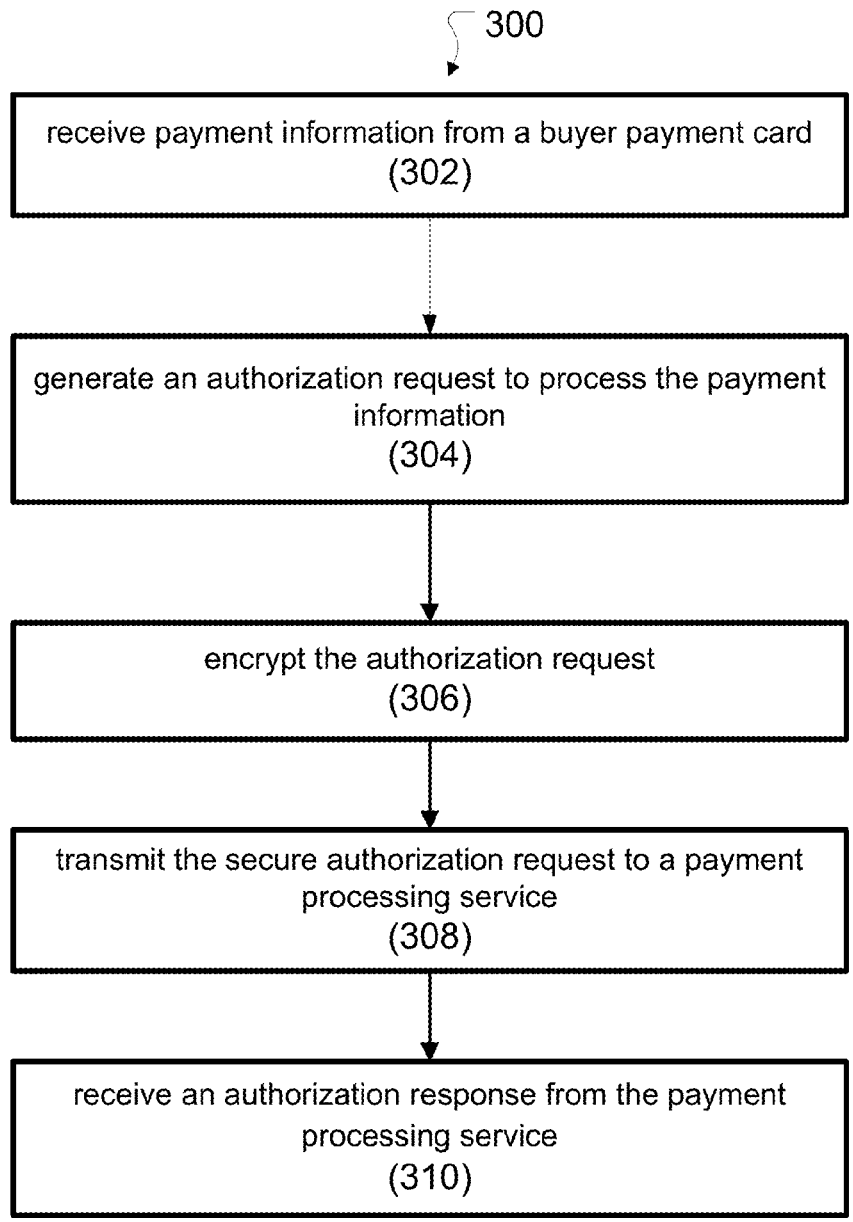
FIG. 3A illustrates an example process for processing a payment using a mobile card reader.

FIG. 3A illustrates an example process 300 for processing a payment using a mobile card reader, such as mobile card reader 100. Process 300 begins with step 302 in which payment information is received, e.g., by the mobile card reader, from a payment card of a buyer. As noted above, payment information may also be manually entered into mobile card reader 100, using input pad 130.

In addition to an indication of an amount of funds to be transferred, payment information can include various types of information about the buyer and/or the buyer's source of funds for the completion of a financial transaction. By way of example, payment information can include a credit card number, debit card number, bank account identifier (e.g., account and routing information), etc. In some implementations, payment information may include the address associated with a cryptographic wallet or account that is associated with a crypto-currency, such as Bitcoin. In some implementations, payment information may also include personal information related to the buyer, such as a first name, last name, middle name, address information and/or rewards account information, etc.

Once the mobile card reader has received the payment information, process 300 proceeds to step 304 in which an authorization request to process the payment information is generated. The authorization request can be composed of various types of information, including any part (or all) of the payment information. For added security, the authorization request may also contain information uniquely identifying a merchant or seller processing the payment information. For example, a merchant name, account identifier, email address and/or location can be included in the authorization request. By way of further example, the authorization request may be comprised of payment information of the buyer, as well as information identifying a location of the mobile card reader, such as global positioning system (GPS) information.

In step 306, the authorization request is optionally encrypted to provide additional security for the buyer's payment information, etc. In certain aspects, once the authorization request has been generated (as discussed in step 304), the authorization request is encrypted by an encryption engine or module of the mobile card reader. After encryption has been performed, the encryption engine will generate a secured version of the authorization request, e.g., a secure authorization request.

Subsequently, in step 308, the secure authorization request is transmitted to a payment processor, e.g., via a radio transceiver of the mobile card reader. In some implementations, a mode of transmission of the secure authorization may depend on an amount of bandwidth available to the mobile card reader. For example, if a high bandwidth connection, such as WiFi is available, then the secure authorization request may be transmitted using a WiFi connection.

Alternatively, if it is determined that a relatively low amount of bandwidth is available to the mobile card reader, for example, because the mobile card reader is in a location with limited wireless network access, then a low bandwidth messaging service may be used. For example, a low bandwidth messaging service such as a short messaging service (SMS), or multimedia messaging service (MMS). In some aspects, the low bandwidth transmission can utilize internet protocol (IP) routing, for example, the secure authorization request may be transmitted via an email service.

After the secure authorization request is received by the payment processor, the secure authorization request is processed to determine if the corresponding financial transaction should be permitted. Processing of the secure authorization request can be performed in different ways. In some implementations, the GPS location of the mobile card reader may be used to verify the secure authorization request, for example by comparing the GPS location with a known location/position of the merchant. However, it is understood that payment processing may be based on different or additional types of information, depending on the design implementation.

After a determination has been made as to whether to allow or decline the authorization request, process 200 proceeds to step 210, wherein an authorization response is received e.g., from the payment processor. In some implementations, the authorization response can be received using the same transmission method or service that was used to transmit the authorization request. For example, if the authorization request was transmitted by the mobile card reader using a SMS service, the authorization response may be received via SMS message. Furthermore, the authorization response may also contain encrypted information. As such, decryption or decoding of the authorization response may be required.

After the authorization response is received (and in some aspects decrypted), the mobile card reader can use the authorization response to indicate (e.g., to a user or merchant) whether the secure authorization request has been approved. Based on the result of the authorization response, the mobile card reader will be permitted to complete the corresponding financial transaction. Indications of an accepted (or declined) request can be echoed to the user, for example using a display (e.g., display 120) of the mobile card reader.

In another aspect, the subject technology includes steps for activating a mobile card reader device, e.g., by a merchant that wishes to use the device to accept payment cards. In some implementations, the subject technology provides convenient means of activating a mobile card reader by swiping a payment card of the merchant to associate the mobile card reader with the merchant and/or a payment account already associated with the merchant. For example, the merchant can create an account with a payment processing service; then, after acquiring a mobile card reader, the merchant may swipe his/her payment card to cause the mobile card reader to activate. An example process for activating a mobile card reader is illustrated in FIG. 3B.

Figure 3B:
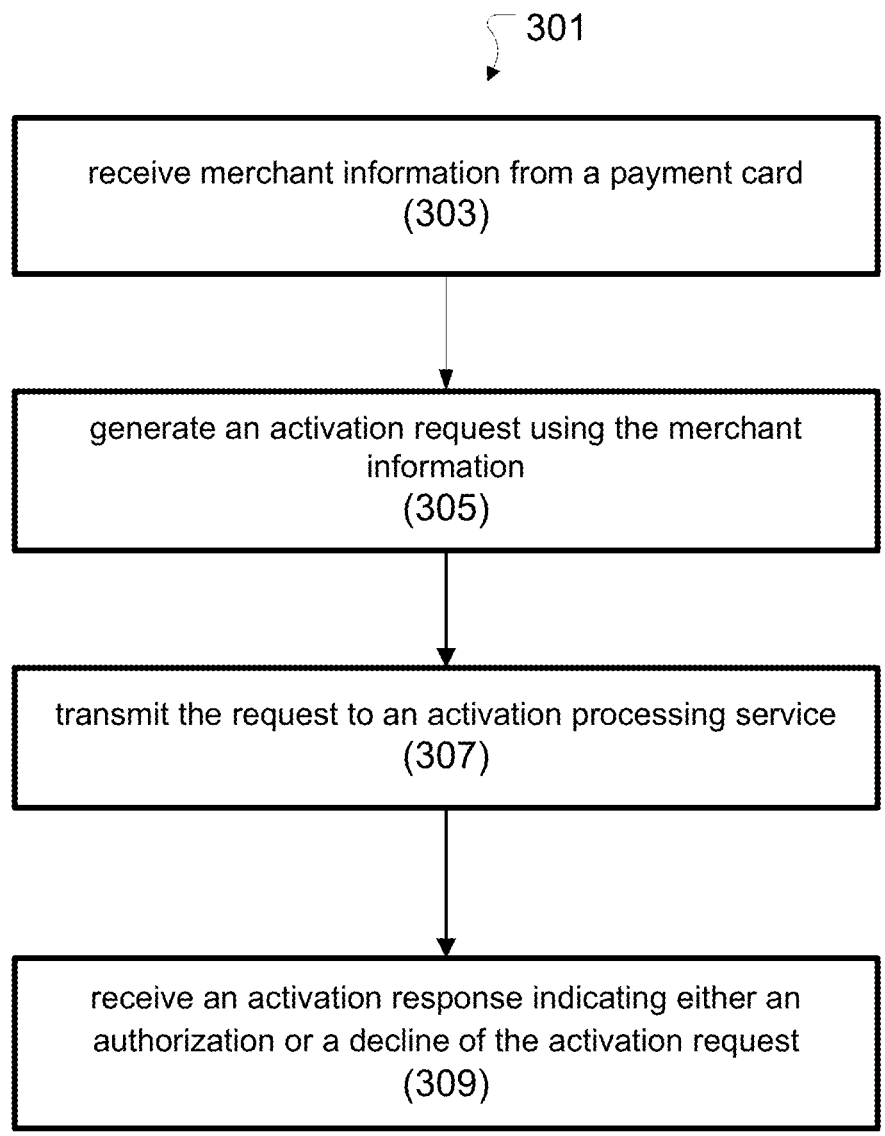
FIG. 3B illustrates an example process for activating a mobile card reader, according to some aspects of the technology.

Specifically, FIG. 3B illustrates an example process 301 for activating a mobile card reader using a payment card. Process 301 begins with step 303 in which merchant information is read from a payment card inserted into a card slot of the mobile card reader (e.g., card slot 140 discussed above). In alternative embodiments, merchant information may be manually received, for example, using an input pad on the mobile card reader. Merchant information can include various types of identifying information that is read from the merchant's payment card. For example, merchant information can include any, or all of the following: merchant name, address, payment card number, payment card type, merchant account number, or an activation code, etc.

Subsequently, in step 305, an activation request is generated based on the merchant information. Similar to the payment processing method discussed with respect to FIG. 3A, the activation request may be encrypted, for example, to provide increased security for the merchant information.

In step 307, the activation request is transmitted to an activation processing service using a transceiver of the mobile card reader. Transmission of the activation request can occur differently depending on the availability of network access (e.g., bandwidth) to the mobile card reader. In certain aspects, bandwidth availability for different communication types can be compared to determine availability of the highest bandwidth connection. For example, the mobile card reader may determine the availability of one or more of a WiFi connection, SMS service, MMS service, and/or email service, etc. If the highest bandwidth connection available is the WiFi, transmission of the activation request may be performed using the WiFi connection.

In some implementations, where only low bandwidth services are available, such as a messaging service (e.g., SMS, MMS or email), a messaging service is used to transmit the activation request. When using a low bandwidth messaging service, the activation request may be transmitted using a specific character limit (e.g., 160 characters or less). Accordingly, in some implementations, multiple transmissions may be needed to complete the transmission of an activation request.

In step 309, an activation response is received, wherein the activation response indicates either an authorization or a decline of the activation request. Based on the activation response, additional functionality of the mobile card reader can be provided, for example, if the activation response is approved. However, it the authorization response is declined, functionality of the mobile card reader (e.g., the ability to accept and process payment cards) is restricted.

In some aspects, additional information from the merchant may be required for activation. For example, mobile card reader activation may require an activation code or password that can be entered using a keypad, such as keypad 130, discussed above.

Figure 4:
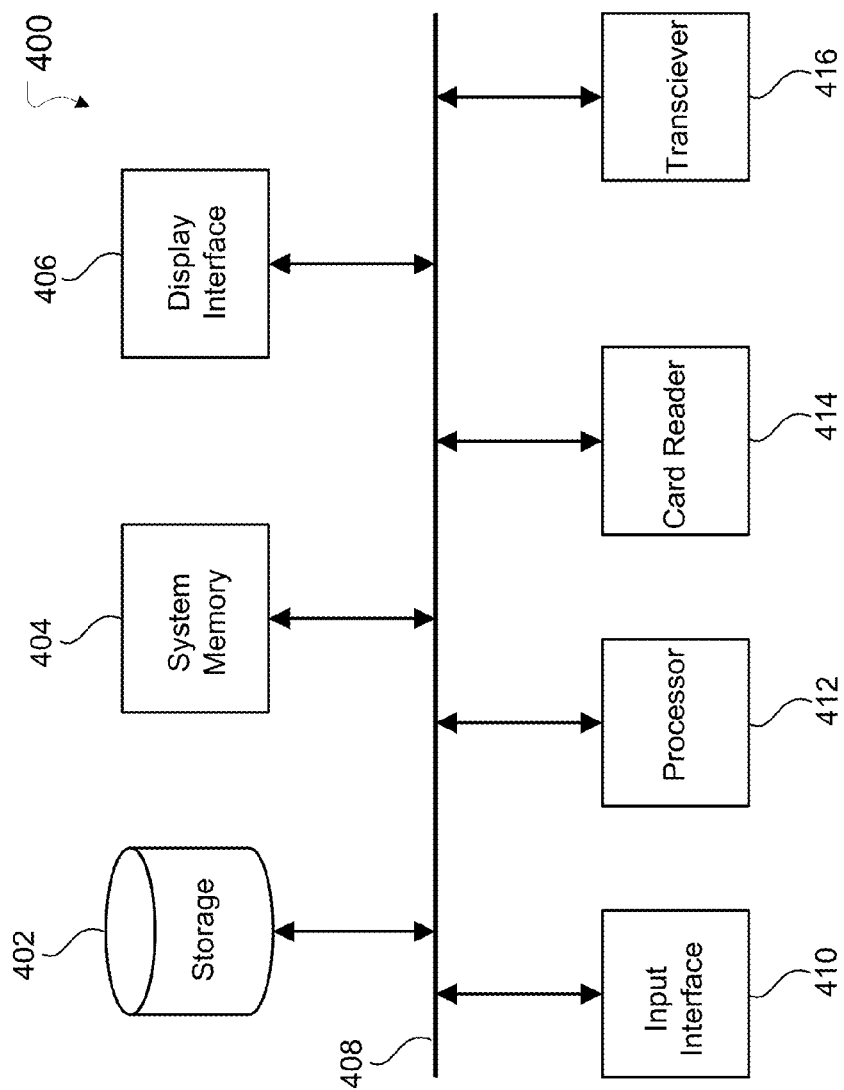
FIG. 4 illustrates a block diagram of example hardware components of a local device for facilitating communication between a mobile card reader and a payment processing service, according to certain aspects of the technology.

FIG. 4 illustrates a block diagram of example hardware components for a local device, according to some aspects of the technology. As discussed above, local device 400 can include various types of computing devices, such as personal computers, tablet PCs, or smart phones, etc. As illustrated, local device 400 includes storage 402, system memory 404, display interface 406, system bus 408, ROM 610, one or more processor(s) 412, card reader 414 and transceiver 416. In some aspects, the system bus 408 collectively represents all system, peripheral, and chipset buses that communicatively connect the numerous internal devices of mobile card reader 400. For instance, system bus 408 communicatively connects the processor(s) 412 with input interface 410, the system memory 404, the display 406 and the permanent storage device 402.

In some implementations, the processor(s) 412 retrieve instructions to execute (and data to process) in order to execute the steps of the subject technology. The processor(s) 412 can include a microcontroller, or a single processor or a multi-core processor in different implementations. Additionally, the processor(s) can comprise one or more graphics processing units (GPUs) and/or one or more decoders (e.g., analog/digital converters), for example, to drive a display (e.g., display 120) that is coupled to display interface 406.

Storage 402 can store static data and instructions needed by the processor(s) 412 and other modules of mobile card reader 400. Similarly, the processor(s) 412 can comprise one or more memory locations such as a CPU cache or processor in memory (PIM), etc. Storage device 402 can comprise a read-and-write memory device. In some aspects, this device can be a non-volatile memory that stores instructions and data even when mobile card reader 400 is without power. Some implementations of the subject disclosure can use a mass-storage device (such as solid state or magnetic devices) e.g., permanent storage device 402.

Although the system memory can be either volatile or non-volatile, in some examples the system memory 404 is a volatile read-and-write memory, such as a random access memory. System memory 404 can store some of the instructions and data that the processor needs at runtime, for example, to facilitate the process of mobile card reader activation, or payment processing, as discussed above.

In some implementations, the processes of the subject disclosure are stored in system memory 404, storage device 402 and/or one or more memory locations embedded with the processor(s) 412. From these various memory units, processor(s) 412 retrieve instructions to execute and data to process in order to execute the processes of some implementations of the instant disclosure.

The bus 408 also connects to card reader 414 and display interface 406. The input card reader 414 enables a user (e.g., a buyer or a merchant) to provide payment card information, for example via a payment card, to mobile card reader 400. Input devices used with card reader 414 can include for example, alphanumeric keypads, such as input device 130; however, other input devices may also be used, including pointing devices (also called "cursor control devices") and/or wireless devices such as wireless keyboards, wireless pointing devices, etc.

Finally, as shown in FIG. 4, bus 408 also communicatively couples mobile card reader 400 to a network (not shown) through transceiver 416. It should be understood that the transceiver 416 can be configured to send/receive radio frequency transmissions using a variety of messaging services. As discussed above, transceiver 416 can be configured to transact data using one or more of a MMS service, SMS service, or an email service. In this manner, mobile card reader 400 can communicate with one or more computers or servers, such as that of a payment processing service or activation service for the mobile card reader.

In practice the methods of the subject technology can be carried out by mobile card reader 400. In some aspects, instructions for performing one or more of the method steps of the present disclosure are stored on one or more memory devices such as the storage 402 and/or the system memory 404. For example, stored instructions may be configured to cause processor(s) 412 to execute steps including, receiving payment information, wherein the payment information specifies a payment amount, generating an authorization request to process the payment information and encrypting the authorization request using an encryption engine to generate a secure authorization request. In certain aspects, the instructions can further include operations for transmitting the secure authorization request using the radio transceiver to a payment processor via a messaging service, wherein the messaging service comprises one or more of a SMS, a MMS or an email service, and receiving an authorization response from the payment processor via the messaging service.

Figure 5:
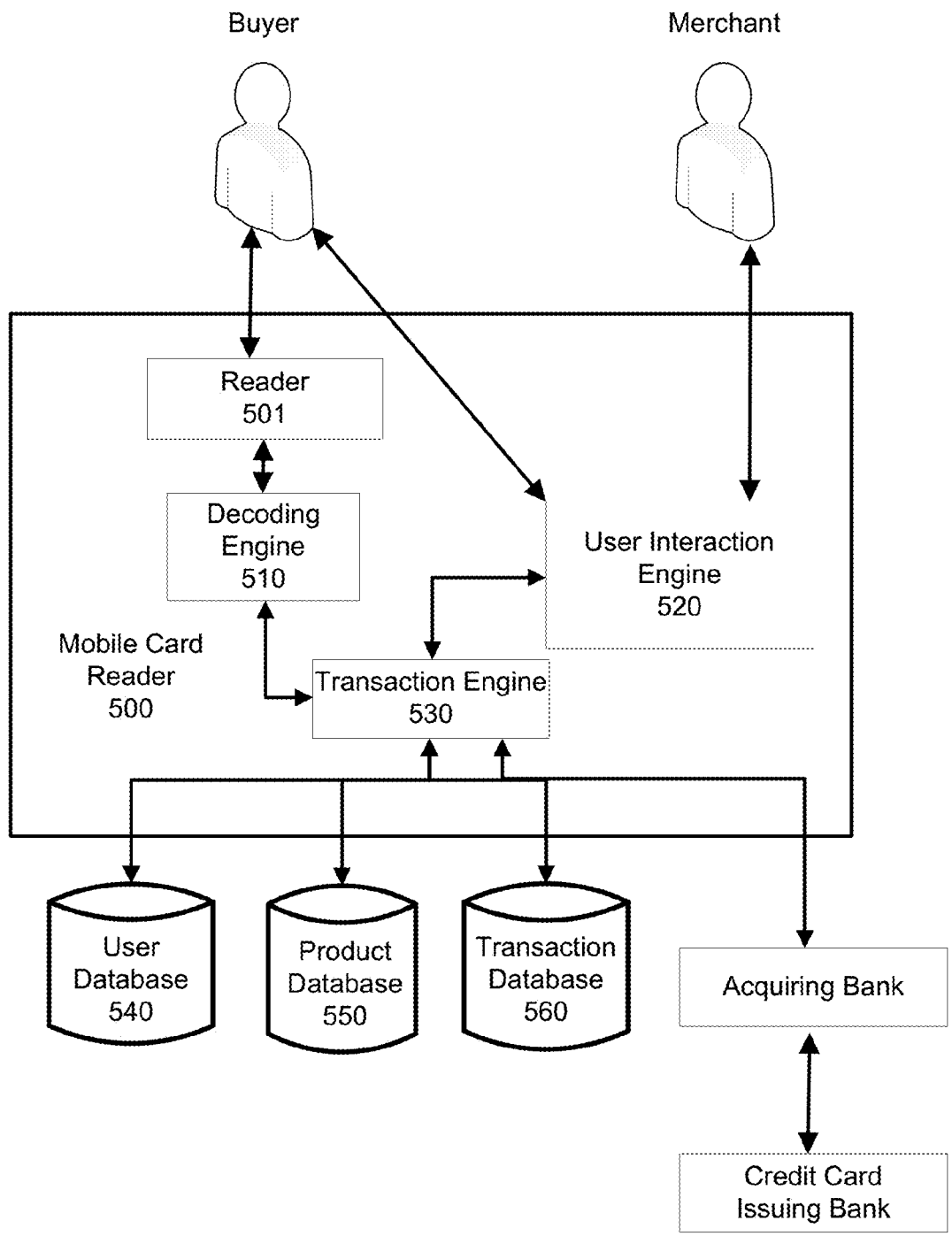
FIG. 5 depicts a conceptual environment in which a mobile card reader of the subject technology can be used to facilitate a financial transaction between a buyer and a merchant.

FIG. 5 depicts a conceptual environment in which a reader of the subject technology is used to facilitate a financial transaction between a buyer and a merchant. Although the diagrams depict components as functionally separate, such depictions are merely for illustrative purposes. It will be apparent that the components portrayed in this figure can be arbitrarily combined or divided into separate software, firmware and/or hardware components, such as combined into a common device or mobile card reader (e.g., mobile card reader 100 discussed above). Furthermore, it will also be apparent that such components, regardless of how they are combined or divided, can execute on the same host or multiple hosts, and wherein multiple hosts can be connected by one or more networks.

In the example of FIG. 5, the system includes a mobile card reader 500, including reader 501, decoding engine 510, a user interaction engine 520, and a transaction engine 530. Additionally, the mobile card reader may also include (or have access to) one or more of a user database 540, a product or service database 550, and a transaction database 560, which are all coupled to transaction engine 530.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 5, mobile card reader 500 can include various software and hardware modules including software, firmware, hardware, or any combination capable of at least receiving the signal, decoding if needed, exchanging information with a transaction server, for example to validate merchant information (form mobile card reader activation) or to verify the buyer and/or seller's account information, conducting the transaction, and generating a receipt. Typical components of mobile card reader 500 can include but are not limited to a battery, LCD driver, a display, a radio frequency (RF) antenna (e.g., a cellular antenna), a speaker, a Bluetooth circuit, and WiFi circuitry.

In response to a financial transaction between a buyer and a seller, mobile card reader 500 accepts information selected including but not limited to information from a financial transaction or information pertaining to financial transaction card used by the buyer in the transaction. Additionally, a financial transaction device can be utilized. Non-limiting examples of financial transaction devices include but are not limited to a wristband, RFID chip, cell phone, biometric marker and the like. At least a portion of this information is communicated to a third party financial institution or payment network to authorize the transaction.

Payment confirmation can be made with a communication channel of the buyer's choice. As non-limiting examples, confirmation of payment can be an electronic notification in the form selected from at least one of, email, SMS message, MMS message, email message, tweet (message delivered via Twitter), instant message, communication within a social network and the like. In response to the transaction, a confirmation (e.g., an authorization response) is made that the buyer is authorized to use the financial transaction card. In certain implementations, a confirmation can be provided that indicates a sufficiency of funds available to the buyer.

In the example of FIG. 5, reader 501 is configured to read data encoded in a magnetic strip of a card being swiped by a buyer and send a signal that corresponds to the data read to mobile card reader 500. However, as discussed above, reader 501 can be configured to receive various payment card types, including but not limited to IC cards that can be provided to reader 501 using a dip slot (e.g., dip slot 140 discussed with respect to FIG. 1).

The size of mobile card reader 500 can be miniaturized for portability. In addition, the mobile card reader 501 is also designed to reliably read the card with minimum error via a single swipe by counteracting vendor specific filtering. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A mobile card reader, comprising:
   a processor;
   a card reader coupled to the processor;
   a short-range communication module coupled to the processor; and
   a long-range communication module coupled to the processor, and wherein the processor is configured to perform operations comprising:
      receiving, via the card reader, financial information associated with a buyer's payment card for initiating a financial transaction with a merchant;
      determining, using the long-range communication module, an available bandwidth for data transacted with a payment processing service, wherein the payment processing service facilitates verification of the financial transaction between the buyer and the merchant;
      determining, using the short-range communication module, an availability of a local device, the local device configured for facilitating communication between the mobile card reader and the payment processing service when the payment processing service is unavailable to the long-range communication module; and selecting a communication path for communicating with the payment processing service based on the available bandwidth.

2. The mobile card reader of claim 1, wherein selecting the communication path further comprises:

selecting a low-bandwidth transmission service if the available bandwidth is below a first predetermined threshold; and transmitting, using the long-range communication module, at least a portion of the financial information to the payment processing service.

3. The mobile card reader of claim 2, wherein the low-bandwidth transmission service comprises one or more of: a short messaging service (SMS), a multimedia messaging service (MMS), or an email service.

4. The mobile card reader of claim 1, wherein selecting the communication path further comprises:

selecting a high-bandwidth transmission service if the available bandwidth is above a second predetermined threshold, and transmitting, using the long-range communication module, at least a portion of the financial information to the payment processing service.

5. The mobile card reader of claim 4, wherein the high-bandwidth transmission service utilizes a protocol supporting at least one of: an internet protocol (IP), a point-to-point protocol (PPP), or a X.25 protocol.

6. The mobile card reader of claim 1, wherein selecting the communication path further comprises:

selecting the local device for facilitating communication with the payment processing service if the available bandwidth is below a third predetermined threshold; and transmitting, using the short-range communication module, at least a portion of the financial information to the local device.

7. The mobile card reader of claim 1, wherein the long-range communication module comprises a general packet radio service (GPRS) module.

8. The mobile card reader of claim 1, wherein the short-range communication module comprises at least one of: a Bluetooth module, an infrared (IR) module, or a Wi-Fi module.

9. A computer-implemented method for selecting a communication path between a mobile card reader and a payment processing service, the method comprising:

receiving, by a processor of the mobile card reader, financial information associated with a buyer's payment card;

determining, by the processor, an available bandwidth for data transacted with a payment processing service;

determining, by the processor, an availability of a local device, wherein the local device is configured to facilitate communication with the payment processing service; and selecting, by the processor, a communication path for communicating with the payment processing service based on the available bandwidth and the availability of the local device.

10. The computer-implemented method of claim 9, further comprising:

selecting, by the processor, a low-bandwidth transmission service if the available bandwidth is below a first predetermined threshold; and transmitting, using the processor, at least a portion of the financial information to the payment processing service via the low-bandwidth transmission service.

11. The computer-implemented method of claim 10, wherein the low-bandwidth transmission service comprises one or more of: a short messaging service (SMS), a multimedia messaging service (MMS), or an email service.

12. The computer-implemented method of claim 9, wherein selecting the communication path further comprises:

selecting, by the processor, a high-bandwidth transmission service if the available bandwidth is above a second predetermined threshold, and transmitting, using the processor, at least a portion of the financial information to the payment processing service via the high-bandwidth transmission service.

13. The computer-implemented method of claim 9, wherein selecting the communication path further comprises:

selecting, by the processor, the local device for facilitating communication with the payment processing service if the available bandwidth is below a third predetermined threshold; and transmitting, using the processor, at least a portion of the financial information to the local device.

14. The computer-implemented method of claim 13, further comprising:

receiving, by the processor, a verification response from the payment processing service, via the local device, the verification response indicating a status of a financial transaction between the buyer and a merchant.

15. A non-transitory computer-readable storage medium comprising instructions stored therein, which when executed by one or more processors, cause the processors to perform operations for facilitating selection of a communication path between a mobile card reader and a payment processing service, the operations comprising:

receiving, by one or more processors of the mobile card reader, financial information associated with a buyer's payment card;

determining, using the processors, an available bandwidth for data transacted with the payment processing service;

determining, using the processors, an availability of a local device, wherein the local device is configured to facilitate communication with the payment processing service; and selecting, using the processors, a communication path for communicating with the payment processing service based on the available bandwidth and the availability of the local device.

16. The computer-readable storage medium of claim 15, the operations further comprising:

selecting, using the processors, a low-bandwidth transmission service if the available bandwidth is below a first predetermined threshold; and transmitting, using the processors, at least a portion of the financial information to the payment processing service via the low-bandwidth transmission service.

17. The computer-readable storage medium of claim 16, wherein the low-bandwidth transmission service comprises one or more of: a short messaging service (SMS), a multimedia messaging service (MMS), or an email service.

18. The computer-readable storage medium of claim 15, wherein selecting the communication path further comprises:

selecting, by the processors, a high-bandwidth transmission service if the available bandwidth is above a second predetermined threshold, and transmitting, using the processors, at least a portion of the financial information to the payment processing service via the high-bandwidth transmission service.

19. The computer-readable storage medium of claim 15, wherein selecting the communication path further comprises:
selecting, by the processors, the local device for facilitating communication with the payment processing service if the available bandwidth is below a third predetermined threshold; and
transmitting, using the processors, at least a portion of the financial information to the local device.

20. The computer-readable storage medium of claim 19, the operations further comprising:
receiving, by the processors, a verification response from the payment processing service, via the local device, the verification response indicating a status of a financial transaction between the buyer and a merchant.

* * * * *